Jan. 12, 1960 C. C. NASH 2,921,189

REDUCTION OF LOCAL OSCILLATOR RADIATION FROM AN ULTRA-HIGH FREQUENCY CONVERTER

Filed Sept. 22, 1958

INVENTOR:
CLEVE C. NASH,

BY Joseph Levinson
HIS ATTORNEY.

United States Patent Office 2,921,189

Patented Jan. 12, 1960

2,921,189

REDUCTION OF LOCAL OSCILLATOR RADIATION FROM AN ULTRA-HIGH FREQUENCY CONVERTER

Cleve C. Nash, Park Ridge, Ill., assignor to General Electric Company, a corporation of New York Application September 22, 1958, Serial No. 762,445

4 Claims. (Cl. 250—20)

Figure 1:
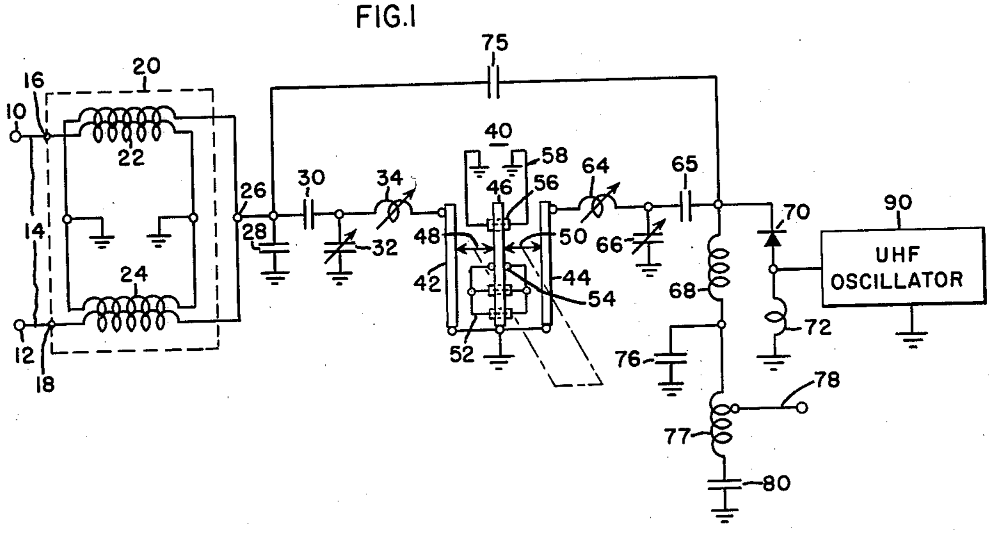

This invention relates to a circuit for reducing local oscillator radiation from an ultra-high frequency converter.

In accordance with the rules of the Federal Communications Commission, ultra-high frequency (UHF) local oscillator radiation must not exceed 500 microvolts per meter. Radiation occurs due to the escape of energy from the UHF converter either through the chassis or the antenna. Chassis radiation includes direct radiation from the local oscillator, power leads, main receiver chassis, tuner chassis, tuner shaft, etc. This type of radiation may be reduced by utilizing improved shielding, filtering and grounding techniques.

Antenna radiation may be defined as that portion of the radiation which disappears if the antenna and transmission lines are disconnected and replaced by an equivalent non-radiating impedance. Almost all antenna radiation results from direct coupling between the local oscillator and the antenna via the crystal, preselector and balun. One method of reducing this type of radiation would be to isolate the antenna from the preselector stage by adding an amplifier stage. However, the addition of an amplifier stage increases the cost of the converter considerably.

Accordingly, it is an object of this invention to provide a UHF converter having reduced antenna radiation without materially increasing the cost of the converter.

In carrying out this invention, a neutralizing circuit is coupled between the input and output of the double-tuned preselector stage for feeding back an out-of-phase voltage to the input of the preselector thereby neutralizing the circuit for the local oscillator frequency.

These and other objects of this invention will be more clearly understood from the following description taken in connection with the accompanying drawings, and its scope will be apparent from the appended claims.

Figure 2:
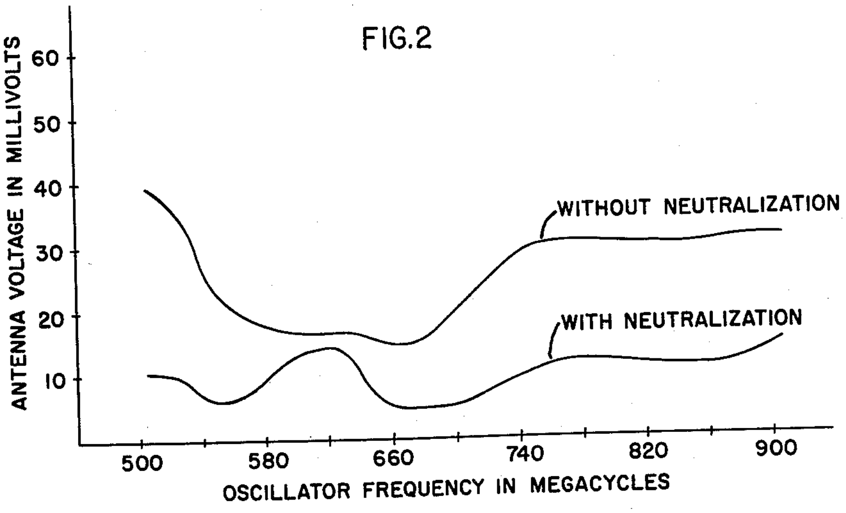

In the drawings,

Figure 1 is a schematic diagram of the UHF converter embodied in this invention, and Figure 2 shows a plot of antenna voltage versus local oscillator frequency for the circuit of Figure 1 with the neutralization circuit embodied in this invention and without such a neutralization circuit.

Referring now to Figure 1, a UHF converter is shown having a pair of antenna terminals 10 and 12 connected via a standard 300 ohm transmission line 14 to the input terminals 16 and 18 of a balun 20. The balun 20 consists of a pair of transformers 22 and 24 and functions to connect the balanced transmission line 14 to the unbalanced line of the converter which has one side grounded. The balun also provides an impedance match between the transmission line and the input impedance of the converter. An output terminal 26 of the balun is connected to a shunt capacitor 28 to ground and to a series capacitor 30. The capacitors 28 and 30 are coupling capacitors and are utilized for matching the balun impedance to that of the first tuned circuit of a preselector 40.

The preselector 40 has a double-tuned stage consisting of the tuning elements 42 and 44. The tuning elements 42 and 44 are circular metallic strips bounded in an insulating medium which in this case is air. A pair of ganged, wiper arms 48 and 50, which contact a grounding plate 46, act as movable shorting bars for the tuning sections 42 and 44, respectively. Consequently, each tuning section 42 and 44 is actually a short circuited transmission line whose length may be varied which varies the frequency to which it is tuned. The tuning elements 42 and 44 are linked coupled by loops 52 and 58 which extend through the grounding plate 46 via insulators 56. The link 58 is grounded at each end and the winding 52 is connected to the grounding plate 46 at point 54. The tuning element 42 has input signals coupled thereto through the coupling capacitor 30 across a variable capacitor 32 and a variable inductor 34. The capacitor 32 is a trimmer capacitor used for alignment at the low frequency end of the band. The inductor 34 is a short length of wire which may be adjusted thereby acting as a trimmer inductance for alignment at the high end of the band. The output of the preselector which appears on tuning element 44 is coupled via a variable inductor 64, a capacitor 66 and a coupling capacitor 65 to one side of a crystal 70. The variable inductor 64 is a trimmer inductance which is utilized for alignment at the high end of the band, and the capacitor 66 is a trimmer capacitor for aligning the low end of the band on the secondary of the preselector. The capacitor 65 couples the output of the secondary of the preselector 40 to the crystal 70 and acts to reduce the loading on the secondary of the preselector. The other side of the crystal 70 is coupled to the output of a UHF oscillator 90. The oscillator 90 may be of conventional type with the only requirements being that it cover the frequency range in question, which runs approximately from 460 to 910 megacycles, and that it furnish sufficient power to the crystal to give a useful degree of conversion efficiency. An inductor 72 is connected between the crystal 70 and ground. This inductor consists of a short piece of wire which may be adjusted thereby providing a means for varying the coupling of the oscillator feed to the crystal 70.

By applying the signal frequency to one side of the crystal 70 and the oscillator frequency to the other side, the signals are heterodyned to produce a difference frequency which corresponds to the intermediate frequency (IF) desired. An inductor 68 is coupled to the junction of capacitor 65 and the crystal 70. The inductor 68 is a UHF choke which functions to remove the oscillator voltage from the IF output. An inductor 77 is connected to the inductor 68 and through a capacitor 80 to ground. A tap 78 is applied to the inductor 77 for obtaining the IF output. The capacitor 80 acts as a blocking capacitor to prevent the IF from being grounded. A capacitor 76 is connected between the junction of inductors 68 and 77 to by-pass UHF and to tune the inductor 77 to the IF output.

The converter just described functions to reduce the ultra-high frequency signals applied at the antenna terminals to intermediate frequency signals in order to permit UHF reception on VHF television receivers. Antenna radiation of the type previously described is coupled from the UHF oscillator 90 through the crystal 70 and by inductive coupling through the preselector to the balun 20, and consequently to the antenna. As a consequence of the inductive coupling provided by the preselector 40, the oscillator voltage at the output of the preselector and the oscillator voltage which is fed back to the input of preselector are approximately 180° out-of-phase. The present invention contemplates connecting a capacitor 75 between the output of the preselector and the input of the preselector in order to neutralize the unwanted oscillator voltage. In Figure 1, the capacitor 75 is connected at the junction of capacitors 65 and the crystal 70 on one end thereof and to the balun output terminal 26 at the other end thereof. The capacitor 75 provides a voltage which is out-of-phase with the voltage fed through the preselector from the oscillator 90 to neutralize the circuit at the local oscillator frequency. The circuit so described remains approximately neutralized over a wide band of tuner frequencies thereby preventing the local oscillator energy from getting to the antenna and radiating. The selective operation of the double-tuned preselector stage 40 for the desired signals is essentially undisturbed by the neutralizing capacitor 75. The size of the neutralizing capacitor 75 should be carefully chosen to feed back the right amount of neutralizing voltage.

Figure 2 illustrates the results which may be obtained from the neutralizing circuit embodied in this invention. Figure 2 is a plot of antenna voltage versus oscillator frequency over a frequency range of 500 megacycles to 900 megacycles which substantially covers the UHF range. The plot was made with the circuit of Figure 1 containing neutralizing capacitor 75 and with the circuit omitting the neutralizing capacitor. The curves are so labeled. It is readily apparent that a reduction in antenna radiation over a wide frequency range is obtained by utilizing the neutralization circuit of this invention.

Since other modifications varied to fit particular operating requirements and environments will be apparent to those skilled in the art, this invention is not considered to be limited to the examples chosen for purposes of disclosure and covers all changes and modifications which do not constitute departures from the true spirit and scope of this invention.

What I claim as new and desire to secure by Letters Patent of the United States is:

1. A circuit for reducing local oscillator radiation from an ultra-high frequency converter comprising an ultra-high frequency converter having a preselector, a crystal and an ultra-high frequency oscillator, said preselector having a pair of inductively coupled double-tuned circuits, means for coupling the output of said preselector to one side of said crystal, means for coupling the output of said oscillator to the other side of said crystal, and means coupled between the preselector output and input for coupling a portion of the oscillator voltage from the output to the input of said preselector to neutralize the oscillator voltage coupled through said preselector from said oscillator.

2. An ultra-high frequency converter having a preselector, a crystal and an ultra-high frequency oscillator, said preselector having a tuned-circuit input and tuned circuit output which are inductively coupled, means for coupling the output of said preselector to one side of said crystal, means for coupling the output of said oscillator to the other side of said crystal, and means for coupling a voltage at the output of said preselector which is out-of-phase with the oscillator voltage passed through said preselector to the input of said preselector for neutralizing the oscillator voltage at the input of said preselector.

3. The structure set forth in claim 2 wherein said last named means comprises a capacitor.

4. An ultra-high frequency converter having a preselector, a crystal and an ultra-high frequency oscillator, said preselector having a tuned-circuit input and tuned circuit output which are inductively coupled, means for coupling the output of said preselector to one side of said crystal, means for coupling the output of said oscillator to the other side of said crystal, and a capacitor connected between said one side of said crystal and the input of said preselector for coupling a voltage which is out-of-phase with the oscillator voltage passed through said preselector for neutralizing the oscillator voltage at the input of said preselector.

No references cited.